US012678367B2

(12) United States Patent
Smies et al.

(10) Patent No.: US 12,678,367 B2
(45) Date of Patent: Jul. 14, 2026

(54) BATHING DEVICES WITH THERAPEUTIC ULTRASOUND

(71) Applicant: Kohler Co., Kohler, WI (US)

(72) Inventors: Ariana Smies, Sheboygan, WI (US); Jason Kwacz, Kohler, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 18/822,978

(22) Filed: Sep. 3, 2024

(65) Prior Publication Data

US 2025/0114271 A1 Apr. 10, 2025

Related U.S. Application Data

(60) Provisional application No. 63/587,810, filed on Oct. 4, 2023.

(51) Int. Cl.

| | |
|---|---|
| ***A61H 23/00*** | (2006.01) |
| ***A61H 9/00*** | (2006.01) |
| ***A61H 23/02*** | (2006.01) |
| ***A61H 33/00*** | (2006.01) |

(52) U.S. Cl.

CPC ....... *A61H 23/0245* (2013.01); *A61H 9/0021* (2013.01); *A61H 33/005* (2013.01); *A61H 33/6089* (2013.01); *A61H 2009/0035* (2013.01); *A61H 2033/0075* (2013.01); *A61H 2203/02* (2013.01)

(58) Field of Classification Search

None

See application file for complete search history.

(56) References Cited

U.S. PATENT DOCUMENTS

| | | | |
|---|---|---|---|
| 3,499,436 | A | 3/1970 | Balamuth |
| 3,585,991 | A | 6/1971 | Balamuth |
| 4,181,124 | A | 1/1980 | Pauletich |
| 4,216,766 | A | 8/1980 | Duykers et al. |
| 4,300,556 | A | 11/1981 | Ochi et al. |
| 4,787,394 | A | 11/1988 | Ogura |
| 4,889,122 | A | 12/1989 | Watmouth et al. |
| 4,893,624 | A | 1/1990 | Lele |
| 4,905,671 | A | 3/1990 | Senge et al. |
| 4,913,156 | A | 4/1990 | Inbar et al. |
| 4,917,095 | A | 4/1990 | Fry et al. |
| 5,048,520 | A | 9/1991 | Vago |

(Continued)

FOREIGN PATENT DOCUMENTS

| | | | |
|---|---|---|---|
| CN | 110743106 | A | 2/2020 |
| KR | 20180006077 | A | 1/2018 |
| WO | WO-2018/196310 | A1 | 11/2018 |

OTHER PUBLICATIONS

First Office Action on CN Patent App. No. 202411349326.5 dated Apr. 1, 2026, 21 pages (with English translation).

*Primary Examiner* — Joseph M Santos Rodriguez
(74) *Attorney, Agent, or Firm* — Foley & Lardner LLP

(57) ABSTRACT

The present disclosure is generally directed towards an ultrasonic showering device. The ultrasonic showering device includes a head portion including a plurality of nozzles that dispense a fluid, a movement component that detects movement of the head portion, and an ultrasonic transducer that generates and transmits ultrasonic energy. The ultrasonic showering device includes a handle portion including a controller that operates the ultrasonic transducer based on the movement component.

12 Claims, 9 Drawing Sheets

(56) References Cited

U.S. PATENT DOCUMENTS

| | | | |
|---|---|---|---|
| 5,121,541 | A | 6/1992 | Patrakis |
| 5,178,134 | A | 1/1993 | Vago |
| 5,305,737 | A | 4/1994 | Vago |
| 5,339,804 | A | 8/1994 | Kemp |
| 5,665,141 | A | 9/1997 | Vago |
| 5,702,353 | A | 12/1997 | Guzzini et al. |
| 5,741,317 | A | 4/1998 | Ostrow |
| 5,859,952 | A | 1/1999 | Levine et al. |
| 6,267,305 | B1 | 7/2001 | Kondo |
| 6,301,433 | B1 | 10/2001 | Montagnino et al. |
| 6,436,060 | B1 | 8/2002 | Talish |
| 6,450,979 | B1 * | 9/2002 | Miwa ................. A61H 23/0245 601/2 |
| 6,523,191 | B2 | 2/2003 | Lahay et al. |
| 6,584,985 | B2 | 7/2003 | Omura |
| 6,755,398 | B1 | 6/2004 | Wong |
| 7,427,273 | B2 | 9/2008 | Mitsui |
| 7,489,787 | B2 | 2/2009 | Macey |
| 7,669,782 | B2 | 3/2010 | Wang et al. |
| 7,819,007 | B2 | 10/2010 | Brooks et al. |
| 7,941,877 | B2 | 5/2011 | Gardenier et al. |
| 7,992,801 | B2 | 8/2011 | Jörgensen |
| 8,226,584 | B2 | 7/2012 | Knapp et al. |
| 8,545,419 | B2 | 10/2013 | Kim |
| 8,556,237 | B2 | 10/2013 | Yamaguchi et al. |
| 8,595,892 | B1 | 12/2013 | Everette |
| 8,608,673 | B2 | 12/2013 | Cao |
| 8,700,176 | B2 * | 4/2014 | Azar ...................... A61B 18/14 607/101 |
| 8,876,025 | B1 | 11/2014 | Wheeler |
| 8,951,215 | B2 | 2/2015 | Moretto |
| 9,005,147 | B2 | 4/2015 | Knapp et al. |
| 9,050,448 | B2 | 6/2015 | Siegel et al. |
| 9,095,671 | B2 | 8/2015 | Feriani et al. |
| 9,108,055 | B1 | 8/2015 | Tellenbach et al. |
| 9,265,694 | B2 | 2/2016 | Ji et al. |
| 9,314,397 | B2 | 4/2016 | Giese et al. |
| 9,491,999 | B2 | 11/2016 | Watanabe et al. |
| 9,492,686 | B2 | 11/2016 | Da Silva |
| 9,504,625 | B2 | 11/2016 | Glasford et al. |
| 9,585,819 | B2 | 3/2017 | Saito |
| 9,675,768 | B2 | 6/2017 | Fink et al. |
| 9,700,686 | B2 | 7/2017 | Gavini et al. |
| 9,744,315 | B1 | 8/2017 | Levi |
| 9,756,924 | B2 | 9/2017 | Jang |
| 9,826,861 | B2 | 11/2017 | Zheng et al. |
| 10,111,806 | B2 | 10/2018 | Chen et al. |
| 10,182,642 | B2 | 1/2019 | Khormaei |
| 10,358,801 | B2 | 7/2019 | Velapure et al. |
| 10,667,991 | B2 | 6/2020 | Taylor |
| 10,675,644 | B2 | 6/2020 | Rexach et al. |
| 10,729,871 | B2 | 8/2020 | Niedermann et al. |
| 10,792,217 | B2 | 10/2020 | Liang |
| 10,933,203 | B2 | 3/2021 | Miller et al. |
| 11,178,475 | B2 | 11/2021 | Hanna et al. |
| 11,253,658 | B2 | 2/2022 | Montagnino et al. |
| 11,273,267 | B2 | 3/2022 | Gavini et al. |
| 11,325,139 | B2 | 5/2022 | Rexach et al. |
| 11,432,685 | B2 | 9/2022 | Yoo et al. |
| 11,529,476 | B2 | 12/2022 | Hunter et al. |
| 2005/0025327 | A1 | 2/2005 | Macey et al. |
| 2005/0075587 | A1 | 4/2005 | Vago |
| 2007/0167882 | A1 | 7/2007 | Guzzini |
| 2008/0023570 | A1 | 1/2008 | Tu et al. |
| 2009/0143004 | A1 | 6/2009 | Tam et al. |
| 2009/0241253 | A1 | 10/2009 | Glasford et al. |
| 2010/0125225 | A1 | 5/2010 | Gelbart et al. |
| 2010/0187328 | A1 | 7/2010 | Konishi et al. |
| 2010/0222752 | A1 | 9/2010 | Collins et al. |
| 2011/0068192 | A1 | 3/2011 | Klicpera |
| 2011/0118633 | A1 | 5/2011 | Miyake et al. |
| 2013/0079733 | A1 | 3/2013 | Burt et al. |
| 2015/0069145 | A1 | 3/2015 | Yen |
| 2015/0125409 | A1 | 5/2015 | Marling et al. |
| 2015/0231416 | A1 | 8/2015 | Siegel et al. |
| 2017/0009435 | A1 | 1/2017 | Burns |
| 2017/0013931 | A1 | 1/2017 | Chen |
| 2017/0072150 | A1 | 3/2017 | Lankau et al. |
| 2017/0209840 | A1 | 7/2017 | Swallow et al. |
| 2018/0236474 | A1 | 8/2018 | Wang |
| 2019/0151192 | A1 | 5/2019 | Yamashita |
| 2020/0101241 | A1 | 4/2020 | Pelkus |
| 2020/0216335 | A1 | 7/2020 | Oh |
| 2021/0022958 | A1 | 1/2021 | Yoo et al. |
| 2021/0178108 | A1 | 6/2021 | Higashiyama |
| 2021/0275834 | A1 | 9/2021 | Duchon et al. |
| 2021/0298992 | A1 | 9/2021 | Liu |
| 2021/0308709 | A1 | 10/2021 | Floyd et al. |
| 2022/0047894 | A1 | 2/2022 | Kenney et al. |
| 2022/0117632 | A1 | 4/2022 | Walker et al. |
| 2022/0126031 | A1 | 4/2022 | Thurman |
| 2022/0160576 | A1 | 5/2022 | Kosecoff |
| 2022/0266270 | A1 | 8/2022 | Seto et al. |
| 2022/0305244 | A1 | 9/2022 | Oh |
| 2022/0401664 | A1 | 12/2022 | Gavini et al. |

* cited by examiner

350

DEEP TISSUE HEATING
FREQUENCY = 1MHz
INTENSITY = 1.5-2.0 $W/cm^2$
TIME OF TREATMENT = APPROX. 8 MIN
- MUSCLE TISSUE: 5-8 MIN IF USING A COUPLING GEL, 10 MIN IF USING TAP WATER
- TENDON: 8 MIN

DUTY CYCLE = 80-100%
HEAD MOVEMENT = 4cm/sec
TREATEMENT AREA = APPROX. 4 TIMES THE SIZE OF THE TRANSDUCER HEAD

FIG. 3B

355

SKIN TIGHTENING
FREQUENCY = 3MHz
INTENSITY = 0.5-1.0 $W/cm^2$
TIME OF TREATMENT = APPROX. 5-10 MIN
DUTY CYCLE = 50-80%
HEAD MOVEMENT = 4cm/sec
TREATMENT AREA = APPROX. 4 TIMES THE SIZE OF THE TRANSDUCER HEAD AND IN A DIRECTIONAL MANNER FOR DESIRED OUTCOME.

FIG. 3C

BATHING DEVICES WITH THERAPEUTIC ULTRASOUND

CROSS-REFERENCE TO RELATED PATENT APPLICATIONS

This application claims the benefit of and priority to U.S. Provisional Patent Application No. 63/587,810, filed Oct. 4, 2023, which is incorporated herein by reference in its entirety.

BACKGROUND

The present disclosure relates generally to bathing components and devices. More specifically, the present disclosure relates to various bathing and cosmetic devices, such as a showerhead, hand showers, cosmetic wand, facial mask, bathtub, bath insert, toilet seats, bidets, and arm or leg cuff that include therapeutic ultrasound capabilities.

Bathing devices (e.g., showers, bathtubs, etc.) often use water, soap, or other mediums to facilitate cleansing or otherwise treating a user. In some implementations, a user operating such devices may wish to treat a specific region of their body due to discomfort, soreness, or for various cosmetic reasons. In such cases, using water pressure or soap alone may not provide relief that a user desires. Thus, it would be advantageous to provide various bathing or cosmetic devices that include therapeutic ultrasonic components to address one or more of the aforementioned issues.

SUMMARY

At least one aspect of the present disclosure relates to an ultrasonic showering device. The ultrasonic showering device includes a head portion including a plurality of nozzles that dispense a fluid, a movement component that detects movement of the head portion, and an ultrasonic transducer that generates and transmits ultrasonic energy. The ultrasonic showering device includes a handle portion including a controller that operates the ultrasonic transducer based on the movement component.

At least one aspect of the present disclosure relates to an ultrasonic cosmetic device. The ultrasonic cosmetic device includes a head portion including an ultrasonic transducer that generates and transmits ultrasonic energy. The ultrasonic cosmetic device includes a handle portion including a controller that operates the ultrasonic transducer. At least one of the head portion or the handle portion includes a movement component that detects movement of the ultrasonic cosmetic device. The controller selectively controls the ultrasonic transducer based on the movement component.

At least one aspect of the present disclosure relates to an ultrasonic cosmetic device. The ultrasonic cosmetic device includes a plurality of ultrasonic transducers that each at least partially contact a surface. The ultrasonic cosmetic device includes a controller that operates the plurality of ultrasonic transducers. The controller selectively turns on or off each of the plurality of ultrasonic transducers for a period of time responsive to determining at least one of the plurality of ultrasonic transducers is at least partially contacting the surface.

BRIEF DESCRIPTION OF THE DRAWINGS

FIG. 3B is a table of example parameters of the control system of FIG. 3A in a first setting, according to an exemplary embodiment.

FIG. 3C is a table of example parameters of the control system of FIG. 3A in a second setting, according to an exemplary embodiment.

DETAILED DESCRIPTION

Generally, bathing devices and/or cosmetic devices, such as a shower, bathtub, or beauty wand, can use various mediums such as water, soap, or lotion to clean or treat a user. In some instances, a user operating such devices may wish to treat a specific area due to discomfort, soreness, or for various cosmetic reasons. Accordingly, various bathing devices and/or cosmetic devices capable of producing therapeutic effects in an efficient and simple manner may be desired.

Referring generally to the FIGURES, disclosed herein are various ultrasonic bathing components and devices for therapeutic purposes. For example, the bathing and/or cosmetic devices described herein include at least one ultrasonic transducer configured to generate and transmit ultrasonic energy (e.g., waves) at various frequencies to a user's skin or other body part to provide a user with therapeutic muscle or tissue heating, skin tightening, and/or various other therapeutic effects. A first set of devices, such as a showerhead and cosmetic wand, can include at least one ultrasonic transducer and one or more movement components, such as roller balls, accelerometers, and/or other components capable of facilitating and/or detecting movement, and a controller operably coupled with the ultrasonic transducer and the movement components. The controller can selectively turn the ultrasonic transducer on or off based on whether the device is moving (e.g., by force of a user) to facilitate maintaining a maximum temperature of the ultrasonic transducer and/or a maximum amount of energy transmitted at a specific location. A second set of devices, such as a mask, bathtub, bath lounge insert, and cuff, can include a plurality of ultrasonic transducers and a controller operably coupled with the ultrasonic transducers. The controller can selectively turn the ultrasonic transducers on or off in a predetermined pattern to facilitate dispersing the generated ultrasonic energy at various positions throughout the device (e.g., in a straight line, in a circular motion, etc.).

Figure 1:
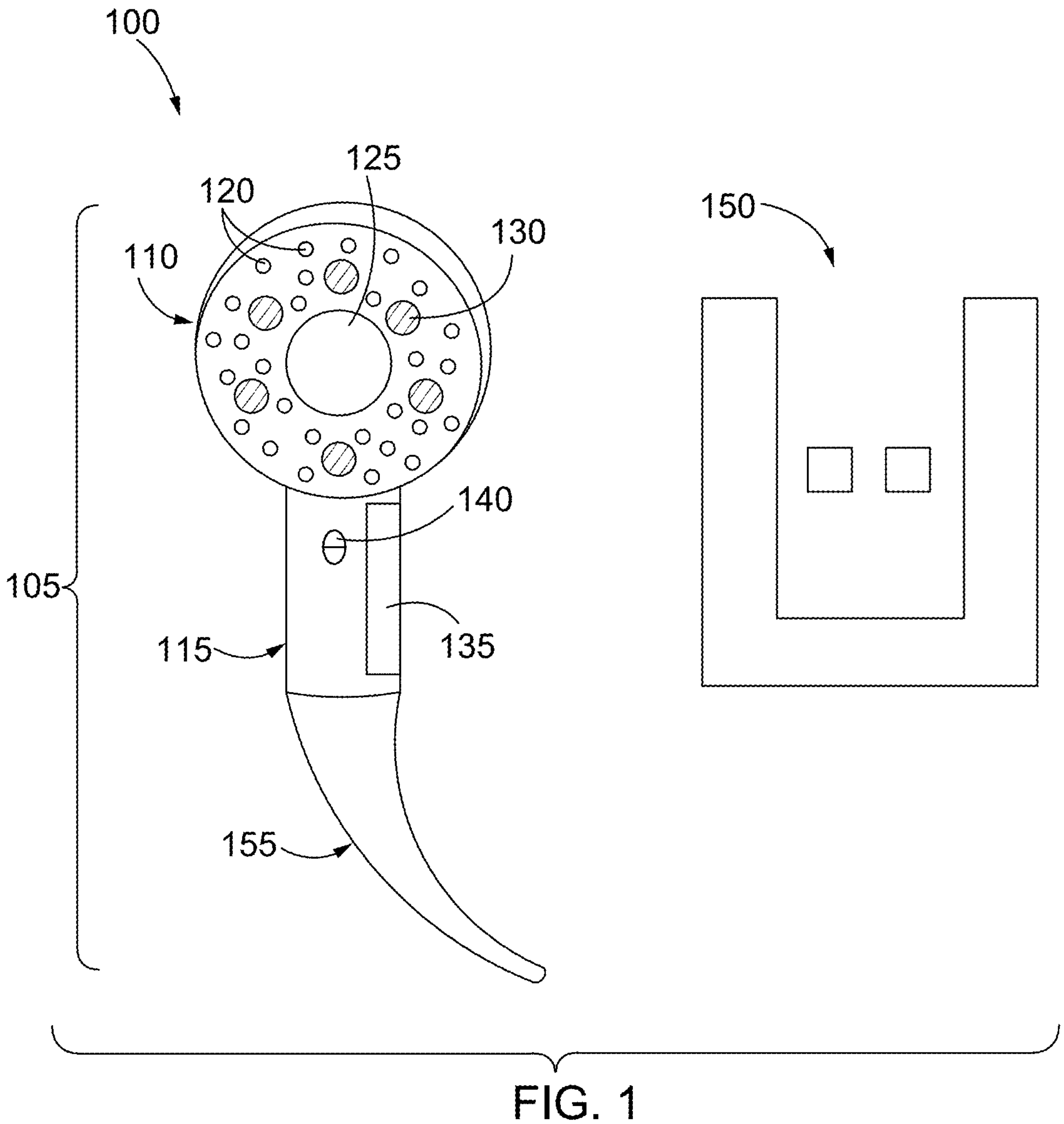
FIG. 1 is a perspective view of an ultrasonic shower assembly, according to an exemplary embodiment.

FIG. 1 depicts a front perspective view of an ultrasonic shower assembly 100, according to an exemplary embodiment. The ultrasonic shower assembly 100 includes an ultrasonic showerhead 105. In some implementations, the ultrasonic showerhead 105 can be a handheld showerhead.

The ultrasonic showerhead 105 can include a head portion 110 and a handle portion 115. The head portion 110 can include one or more nozzles 120 and at least one ultrasonic transducer 125. In some implementations, the head portion 110 can include one ultrasonic transducer 125 positioned in a center of the head portion 110. In some implementations, the head portion 110 can include a plurality of ultrasonic transducers 125. For example, in some implementations, the head portion (or another part of the showerhead 105) can include a large transducer 125 and one or more smaller transducers 125 positioned around the large transducer 125. The one or more nozzles 120 can allow a fluid or other medium to disperse from within the head portion 110 to an exterior of the head portion 110. In some implementations, the nozzles 120 and/or the movement components 130 can surround the transducer 125 in a circumferential direction. In some implementations, the one or more transducers 125 can be offset from a center portion of the head portion 110. For example, in some implementations, at least one nozzles 120 and/or at least one movement component 130 can be positioned at or near the center portion of the head portion 110. In some implementations, the one or more transducers 125 can surround the center portion in a circumferential direction.

The ultrasonic transducer 125 may be configured to generate and transmit ultrasonic energy at a frequency within about the range of 1 MHz to 3 MHz. In some implementations, the ultrasonic transducer 125 may be configured to generate and transmit ultrasonic energy at a higher or lower frequency. For example, the ultrasonic transducer 125 may be configured to generate and transmit ultrasonic energy at a frequency between 20 kHz to 5 MHz.

The showerhead 105 can include at least one movement component 130. The movement component 130 can include or can be a roller (e.g., a roller ball). The movement component 130 can be or can include various alternative or additional movement features for facilitating or detecting movement including, but not limited to, accelerometers, cameras, millimeter waves, infrared light sensors, visible light sensors, microphones, acoustic sensors, triboelectric sensors, inertia-switch sensors, temperature Sensors (e.g., thermistors, thermocouples, etc.), and/or vibration sensors.

The one or more movement components 130 (e.g., roller balls) can at least partially protrude outward beyond a surface of the head portion 110 of the showerhead 105. The movement components 130 can facilitate allowing the showerhead 105, or at least a portion of the showerhead 105, to move or glide across a surface with reduced friction. The movement components 130 can facilitate detecting movement of the head portion 110. For example, the movement components 130 can include roller balls that protrude outward beyond a surface of the head portion 110 and outward beyond the nozzles 120. The roller balls can at least partially contact a portion of a user's skin or other surface during use. The roller balls can facilitate sliding the showerhead 105 across the surface (e.g., across the skin) while the roller balls remain in contact with the surface. With this configuration, a user of the showerhead 105 can position the head portion 110 such that at least one movement component 130 contacts a portion of the user's skin or other body part and the user can move the showerhead 105 along the skin while the movement components 130 remain in contact with the skin.

The handle portion 115 can include at least one at least one controller located within the handle portion 115. The controller is described in greater detail herein with reference to FIGS. 3A-3C. The handle portion 115 can include at least one switch button 140. The switch button 140 can allow the controller to operate the ultrasonic transducer 125 at least at two distinct frequencies. For example, the switch button 140 can control the ultrasonic transducer 125 to switch between generating and transmitting ultrasonic energy at a frequency of about 1 MHz to a frequency of about 3 MHz. By way of example, a user can use the switch button 140 to set the ultrasonic transducer 125 to generate and transmit ultrasonic energy at a frequency of about 1 MHz for muscle heating or relaxation. At this frequency, a user can place the head portion 110 on a portion of skin that covers a sore or tight muscle and can move the head portion 110 around to facilitate heating the subcutaneous muscles or tissues (e.g., deep tissue massaging).

A user can use the switch button 140 to set the ultrasonic transducer 125 to generate and transmit ultrasonic energy at a frequency of about 3 MHz for cosmetic enhancement, such as skin tightening. At this frequency, a user can place the head portion 110 on a portion of skin to facilitate tightening the skin. In some implementations, the switch button 140 can include a switch to cause the controller to alternate the frequency of the ultrasonic transducer 125 (e.g., to alternate between 1 MHz and 3 MHz.)

In some implementations, the ultrasonic showerhead 105 can include a cord 155 that can electrically couple the showerhead 105 with an electricity source to operate the controller. In some implementations, the showerhead 105 may be cordless. For example, the handle portion 115 can include at least one battery 135. The battery 135 can be stored within the handle portion 115 (e.g., beneath a panel). The battery 135 can be rechargeable. For example, the showerhead 105 can couple with a docking station 150. The docking station 150 can be or can include a wireless electrical charge station that provides electrical charge to the battery 135.

In some implementations, the showerhead 105 can fluidly couple to a fluid supply, such as a municipal water supply or other fluid supply, via one or more hoses or tubes. In some implementations, the showerhead 105 may not include a hose to couple to a fluid supply. For example, the showerhead 105 can include a reservoir or other section that can store fluid or another medium (e.g., soap, lotion/moisturizer, water, etc.) for use with the showerhead 105. The reservoir can be fluidly coupled to the one or more nozzles 120 such that medium within the reservoir can dispense out of the nozzles 120. In some implementations, the showerhead 105 can include multiple reservoirs and/or can include both a reservoir and a connection to a fluid supply, such as a municipal water supply. In these implementations, the showerhead 105 can be configured to combine the contents within the reservoirs and/or within the fluid supply to dispense each simultaneously out of the nozzles 120. For example, the showerhead 105 can include a mixing chamber. As another example, a first subset of the nozzles 120 can couple to a first reservoir and a second subset of nozzles 120 can couple to a second reservoir and/or a fluid supply such that the mediums mix in air external to the head portion 110.

Figure 2:
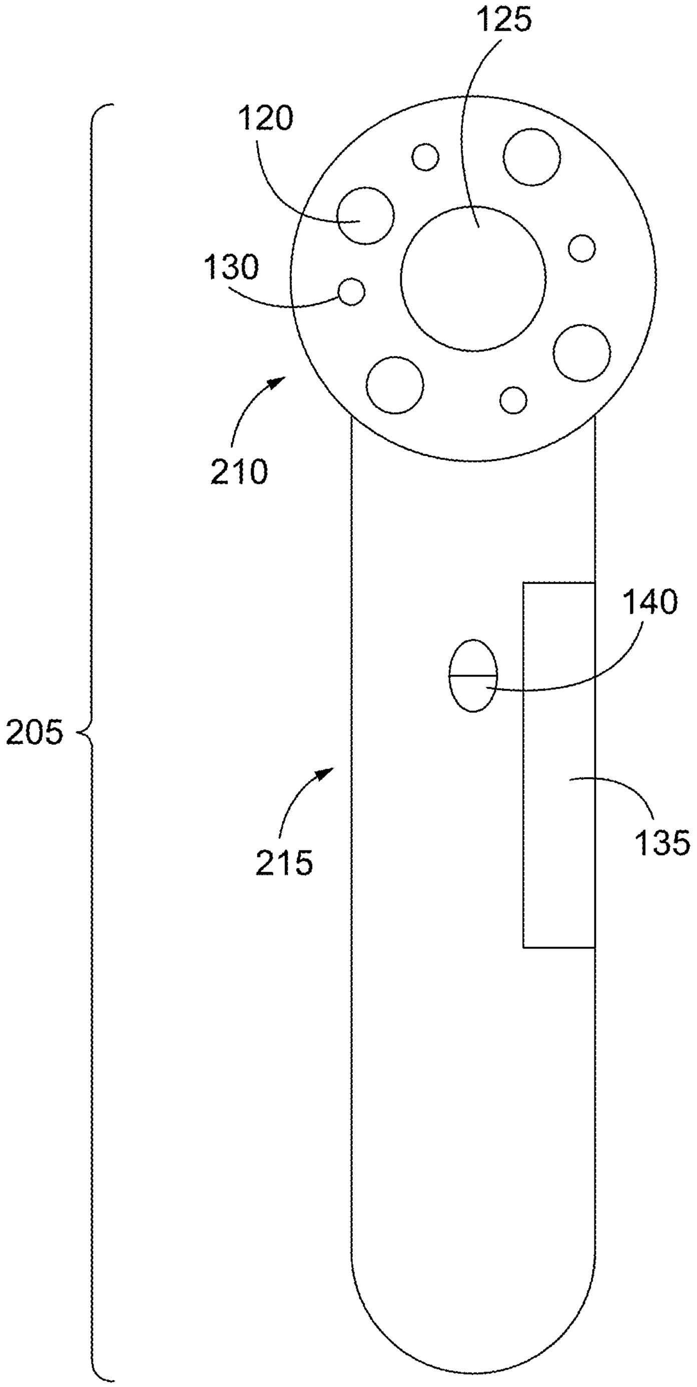
FIG. 2 is a front view of a handheld cosmetic device, according to an exemplary embodiment.

FIG. 2 depicts a front view of a handheld cosmetic device 205, according to an exemplary embodiment. The cosmetic device 205 can be used within a shower or bath environment, or the cosmetic device 205 can be used independently of a bath or shower. The cosmetic device 205 can include some similar features as the showerhead 105. For example, the cosmetic device 205 can include a head portion 210 and a handle portion 215. The head portion 210 can include at least one ultrasonic transducer 125. For example, the ultrasonic transducer 125 can be positioned in a center of the head portion 210. The head portion 210 can include a plurality of ultrasonic transducers 125. For example, in some implementations, the head portion (or another part of the showerhead 105) can include a large transducer 125 and one or more smaller transducers 125 positioned around the large transducer 125. In some implementations, the one or more transducers 125 can be offset from a center portion of the head portion 210. For example, in some implementations, the one or more transducers 125 can surround the center portion in a circumferential direction.

In some implementations, the head portion 210 can include one or more nozzles 120 for dispensing a medium. For example, the cosmetic device 205 can include at least one reservoir for containing and dispensing at least one medium (e.g., lotion, soap, water, etc.) out of the nozzles 120. In some implementations, the cosmetic device can include one or more hoses or tubes (not shown in FIG. 2) to fluidly couple to a fluid supply, such as a municipal water supply or other fluid supply. In some implementations, the cosmetic device 205 may not include any nozzles and/or a user can apply a desired fluid, soap, lotion, or other medium directly to the skin of the user and/or directly to the cosmetic device 205.

In some implementations, the cosmetic device 205 can include at least one movement component 130. The movement component 130 can be or can include an accelerometer. The movement component 130 can be or can include various alternative or additional movement features for facilitating or detecting movement including, but not limited to, roller balls, cameras, millimeter waves, infrared light sensors, visible light sensors, microphones, acoustic sensors, triboelectric sensors, inertia-switch sensors, temperature sensors (e.g., thermistors, thermocouples, etc.), and/or vibration sensors.

In some implementations, the head portion 210 can include a concave or convex surface to facilitate interfacing with a portion of a body. For example, the head portion 210 can be at least partially concave or curved to substantially match a profile of a user's cheek, chin, or other body part. In some implementations, the head portion 210 can be at least partially convex to substantially match a profile of a user's undereye area or other body part. In some implementations, the head portion 210 may be substantially flat to substantially match a profile of a user's forehead area or other body part.

In some implementations, the head portion 210 can detachably couple to the handle portion 215 such that the head portion 210 can be removed and/or exchanged with a new or different head portion 210. For example, the cosmetic device 205 can include a first head portion 210 having a first shape or profile (e.g., a concave surface including the ultrasonic transducer 125) and a second head portion 210 having a second shape or profile (e.g., a flat surface or a convex surface including the ultrasonic transducer 125).

The head portion 210 can include various shapes including, but not limited to, round, square, triangular, octagonal, asymmetrical, etc. In some implementations, the head portion 210 can include at least one dampener to facilitate dampening the transducer 125 around sensitive skin areas. The head portion 210 can removably couple to the handle portion 215 in various ways including, but not limited to, clasps, clips, tabs, fasteners, threads, etc. With this configuration, a user can remove a first head portion 210 from the handle portion 215 and can replace the first head portion 210 with a new first head portion 210 or with a second head portion 210 by electrically and physically recoupling the head portion 210 with the handle portion 215.

The handle portion 215 can include a controller (e.g., controller 300 described herein) and/or at least one switch button 140. The switch button 140 can allow the controller to operate the ultrasonic transducer 125 at least at two distinct frequencies. For example, the switch button 140 can control the ultrasonic transducer 125 to switch between generating and transmitting ultrasonic energy at a frequency of about 1 MHz to a frequency of about 3 MHz. By way of example, a user can use the switch button 140 to set the ultrasonic transducer 125 to generate and transmit ultrasonic energy at a frequency of about 1 MHz for muscle heating or relaxation. At this frequency, a user can place the head portion 210 on a portion of skin that covers a sore or tight muscle and can move the head portion 210 around to facilitate heating the subcutaneous muscles or tissues (e.g., deep tissue massaging). A user can use the switch button 140 to set the ultrasonic transducer 125 to generate and transmit ultrasonic energy at a frequency of about 3 MHz for cosmetic enhancement, such as skin tightening. At this frequency, a user can place the head portion 210 on a portion of skin to facilitate tightening the skin. In some implementations, the switch button 140 can include a switch to cause the controller to alternate the frequency of the ultrasonic transducer 125 (e.g., to alternate between 1 MHz and 3 MHz.)

In some implementations, the cosmetic device 205 can include various lighting features, such as a light-emitting diode (LED) to facilitate lighting an area that the head portion 210 comes into contact with. In some implementations, the cosmetic device 205 can include a cord (not shown in FIG. 2) that can electrically couple the cosmetic device 205 with an electricity source to operate the controller of the cosmetic device 205. In some implementations, the cosmetic device 205 may be cordless. For example, the handle portion 215 can include at least one battery 135. The battery 135 can be stored within the handle portion 215 (e.g., beneath a panel). The battery 135 can be rechargeable. For example, the cosmetic device 205 can couple with a charging dock or station. The docking station can be or can include a wireless electrical charge station that provides electrical charge to the battery 135 wirelessly.

Figure 3A:
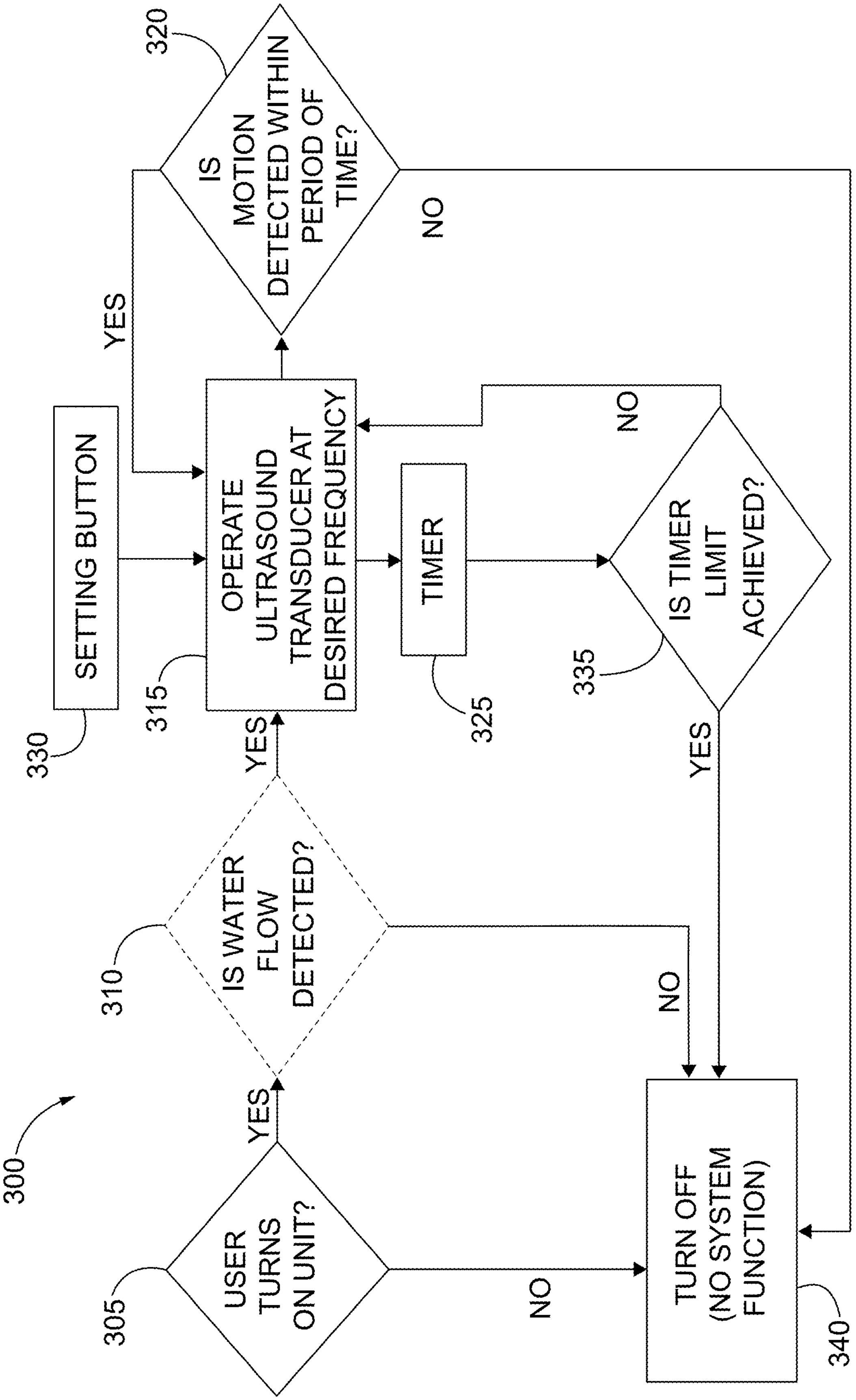
FIG. 3A is a schematic of a control system for the ultrasonic shower assembly of FIG. 1 and/or for the handheld cosmetic device of FIG. 2, according to an exemplary embodiment.

FIG. 3A depicts a logic schematic of a controller 300 (e.g., a programmable logic controller (PLC)) of the one or more transducers 125 of the showerhead 105 and/or the cosmetic device 205. FIG. 3B depicts example parameters 350 of the controller 300 in a first setting (e.g., a deep tissue heating setting at a frequency of 1 Mhz). FIG. 3C depicts example parameters 355 of the controller 300 in a second setting (e.g., skin tightening at a frequency of 3 MHZ). As depicted in FIGS. 3A-3C, the controller 300 can include at least one setting input 330 that receives an input via the switch button 140 and/or via another button input of the showerhead 105 and/or the cosmetic device 205. The controller 300 can include at least one timer 325 that is configured to time the operation of the one or more transducers 125 of the showerhead 105 and/or the cosmetic device 205. The controller 300 may be configured to determine a time limit based on the timer 325. For example, the time limit may be between 10 and 30 minutes. The time limit may be substantially greater or lesser than 10-30 minutes.

For the showerhead 105, the controller 300 may be configured to determine water is flowing through the showerhead 105 and/or the showerhead 105 is moving. If the controller 300 determines that water is not flowing through the showerhead 105 and/or the showerhead 105 is not moving, the controller 300 may be configured to shut the one or more transducers 125 of the showerhead 105 off. For example, at operation 305, the controller 300 may be configured to determine if a switch of the one or more transducers 125 of the showerhead 105 has been turned on.

Responsive to the transducer 125 being switched on, the controller 300 may be configured to detect if water, or another medium, is flowing through the nozzles 120 of the showerhead 105 at operation 310. For example, the controller 300 may be operably coupled to a sensor that detects waterflow through the showerhead 105. Responsive to determining water or another medium is flowing through the showerhead 105, the controller 300 may be configured to operate the one or more ultrasound transducers 125 at a desired frequency based on an input via the setting input 330 (e.g., based on a user selecting a frequency using the switch button 140 as outlined in FIGS. 3B and 3C) at operation 315.

The controller 300 may be configured to start the timer 325 and determine if motion is detected within a predetermined time threshold via the one or more movement components 130 at operation 320. If the controller 300 determines that the showerhead 105 is moving via the movement components 130, the controller 300 may be configured to continue to operate the one or more transducers 125 at the selected frequency. If the controller 300 determines that the no water or other medium is flowing through the showerhead 105, the controller 300 may be configured to turn off the transducers 125 at operation 340. If the controller 300 determines that the showerhead 105 is not via the movement components 130, the controller 300 may be configured to turn off the transducers 125 at operation 340. If the controller 300 determines that an overall timer limit (e.g., as outlined in FIG. 3B or 3C) has been reached at operation 335, the controller 300 may be configured to turn off the transducers 125 at operation 340. In other words, the controller 300 may be configured to shut off the one or more transducers 125 responsive to determining that no water or other medium is flowing through the nozzles 120 of the showerhead 105, that the showerhead 105 is not moving, and/or that the transducers 125 have been generating and transmitting energy beyond a timing threshold. With this configuration, the controller 300 controls a maximum temperature produced by the one or more transducers 125 over a specific area for a predetermined period of time.

In some implementations, the battery 135 of the showerhead 105 and/or the cosmetic device 205 can facilitate the timer 325 and/or can act as the timer 325. For example, the battery 135 can include a battery life about equal to the timer limit, such that the ultrasonic transducer 125 will always turn off within the timer limit.

In some implementations, the controller 300 of the cosmetic device 205 may operate identically as the controller 300 of the showerhead 105. In some implementations, the controller 300 of the cosmetic device 205 may not determine if water or another medium is flowing through nozzles 120 of the cosmetic device 205 at operation 310. In other words, the controller 300 may be configured to shut off the one or more transducers 125 of the cosmetic device 205 responsive to determining that the cosmetic device 205 is not moving and/or that the transducers 125 have been generating and transmitting energy beyond a timing threshold. With this configuration, the controller 300 controls a maximum temperature produced by the one or more transducers 125 over a specific area for a predetermined period of time.

Figure 4A:
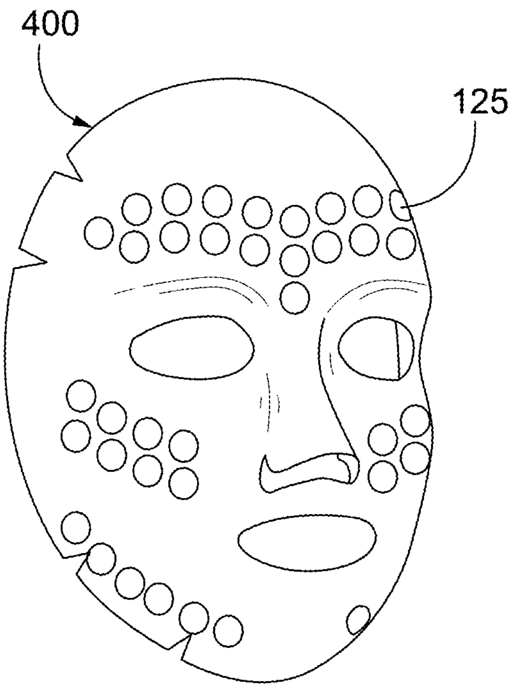
FIG. 4A is a perspective view of an ultrasonic facial mask, according to an exemplary embodiment.

FIG. 4A depicts a perspective view of an ultrasonic mask 400. The ultrasonic mask 400 can be used, for example, over a user's face. For example, the ultrasonic mask 400 can include a shape that generally conforms to facial features. The mask 400 can include a plurality of ultrasonic transducers 125 located on an internal surface of the mask 400 (e.g., a surface that faces and/or at least partially contacts a user's face during use). The transducers 125 can be located in various positions along the mask 400. For example, at least one transducer 125 can be located at or near a position of the mask 400 that contacts or directly faces a user's forehead or temple region. As another example, at least one transducer 125 can be located at or near a position of the mask 400 that contacts or directly faces a user's cheek or under eye region. As another example, at least one transducer 125 can be located at or near a position of the mask 400 that contacts or directly faces a user's chin or jaw line area. The transducers 125 can be positioned at various other locations of the mask 400.

Figure 5:
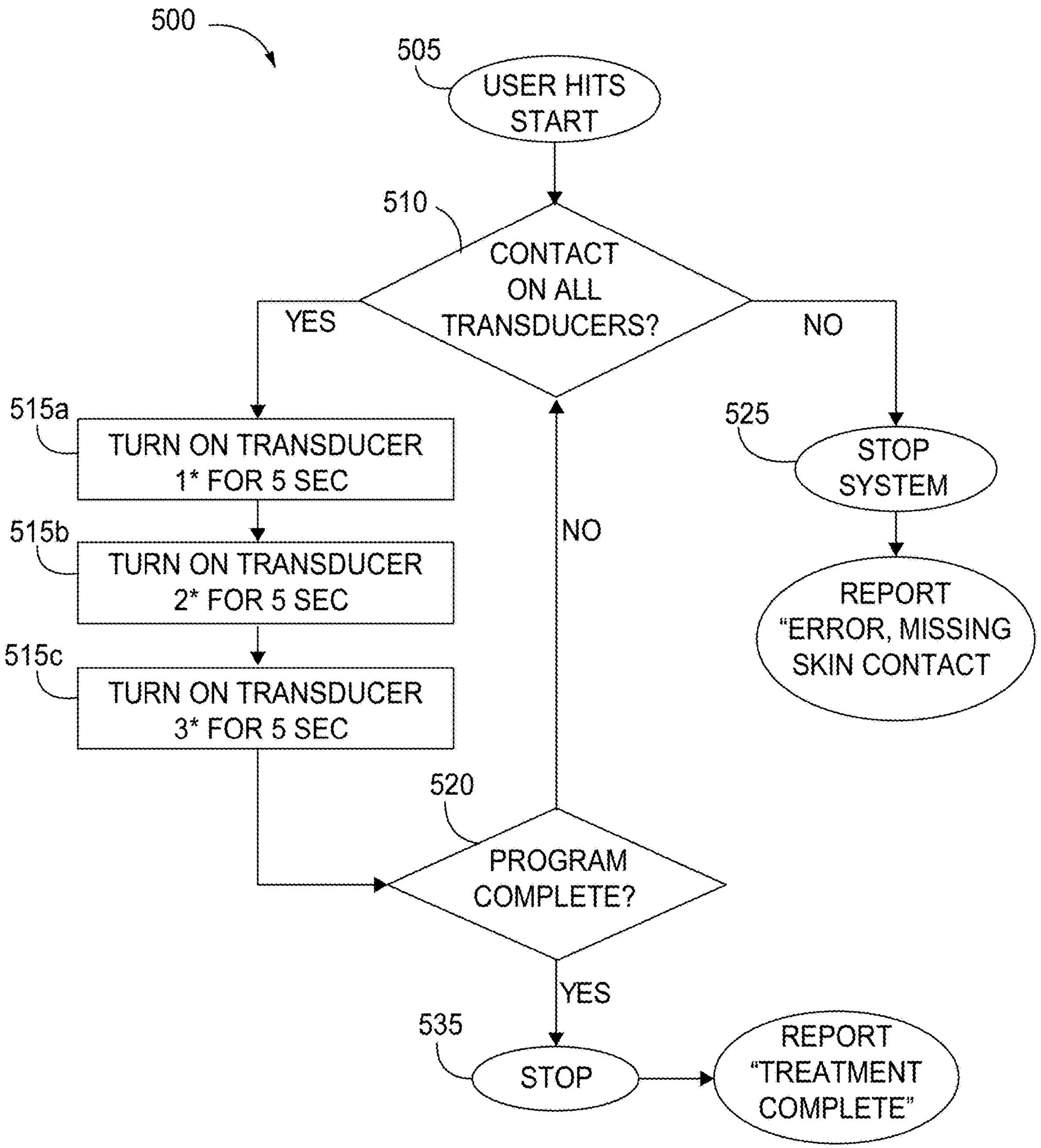
FIG. 5 is a schematic of a control system for the ultrasonic mask of FIG. 4A, according to an exemplary embodiment.

The mask 400 can include at least one controller (e.g., controller 500 depicted in FIG. 5). In some implementations, the controller can be embedded into a portion of the mask 400. In some implementations, the controller can be operably coupled to the mask 400 via one or more wires. In some implementations, the mask 400 can include a rechargeable battery. In some implementations, the mask 400 can include at least one cord or wire that can electrically couple the transducers 125 to an electricity source.

Figure 4B:
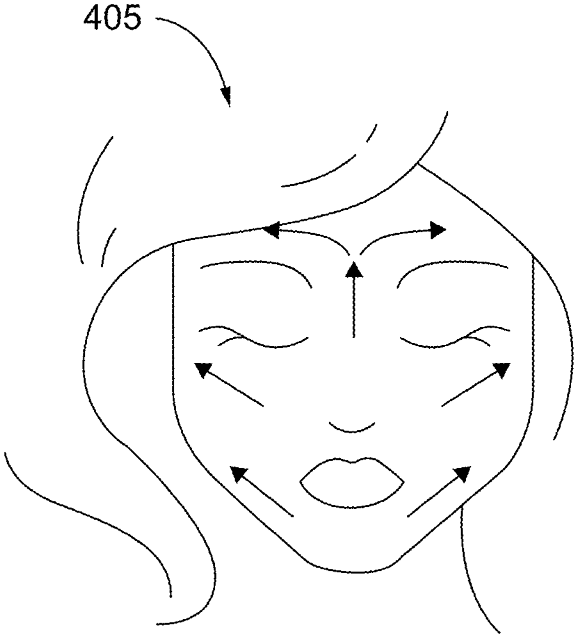
FIG. 4B is a schematic of movement of ultrasonic waves emitted by the ultrasonic facial mask of FIG. 4A, according to an exemplary embodiment.

The controller of the mask 400 can cause the transducers 125 to turn on or off in a predetermined pattern such that the transducers 125 generate and transmit ultrasonic energy in a specific movement along a user's face. For example, FIG. 4B depicts an example movement pattern 405 of the transducers 125 of the mask 400. As depicted in FIG. 4B, in some implementations, a subset of transducers 125 closest to the nose and chin of a user may turn on and generate ultrasonic energy first. After a period of time, the subset of transducers 125 closest to the nose and chin of a user may turn off and a subset of transducers 125 farther away from the nose and/or chin may turn on such that the generated and transmitted ultrasonic energy generally moves along a pathway depicted in the arrows shown in FIG. 4B.

After a first cycle (e.g., the transducers 125 causing ultrasonic energy to move in a direction shown in the arrows of FIG. 4B), cycle can begin again from the beginning (e.g., the subset of transducers 125 closest to the nose and chin can turn on again) to repeat the movement, or the cycle can be reversed such that the energy is transmitted in a direction opposing the arrows shown in FIG. 4B. In some implementations, the transducers 125 can alternate or vary in frequency of the ultrasonic energy generated.

In some implementations, the transducers 125 can follow a pattern that may or may not be linear (e.g., a circular pattern, a zig-zag pattern, a random pattern, etc.). The controller can turn the transducers 125 on or off to define the pattern based on a plurality of predetermined or selected settings of the mask 400. For example, in some implementations, the mask 400 can include at least one input, such as a switch button or user interface, to receive user inputs to define a frequency and/or pattern of the transducers 125.

FIG. 5 depicts a logic schematic of a controller 500 (e.g., a PLC) of the one or more transducers 125 of the mask 400. The controller 500 may be configured to turn the transducers 125 on or off to create a patterned movement of ultrasonic energy, as described herein. The controller 500 may be configured to determine whether the one or more transducers 125 are in contact with a user's skin and control operation of the transducers 125 based on the contact.

For example, at operation 505, the controller 500 may be configured to receive an input via the mask 400 (e.g., via a switch button or user interface) indicating to start the mask 400. At operation 510, the controller 500 may be configured to determine whether at least one or all of the transducers 125 are in contact with a user's skin via conduction and/or via one or more sensors (e.g., capacitive sensor, touch sensor, pressure sensor, etc.). Responsive to determining one or more transducers 125 are not in contact with a user's skin, the controller 500 may be configured to turn off all transducers 125 and stop the program at operation 525.

Responsive to determining the transducers 125 are in contact, the controller 500 can selectively turn the transducers 125 on or off for a period of time to provide ultrasonic energy in a pattern. By way of example, as depicted in FIG. 5, the controller 500 can cause a first transducer 125 to generate and transmit ultrasonic energy for a period of time (e.g., five seconds), then turn off, at operation 515*a*. The controller 500 can cause a second transducer 125 to generate and transmit ultrasonic energy for a period of time (e.g., five seconds), then turn off, at operation 515*b*. The controller 500 can cause a third transducer 125 to generate and transmit ultrasonic energy for a period of time (e.g., five seconds), then turn off, at operation 515*c*, and so on. Responsive to the controller 500 determining a cycle is complete at operation 520, the controller 500 can cause all transducers 125 to turn off at operation 535. This example is for illustrative purposes. The controller 500 may be configured to cause various amounts of transducers 125 to generate and transmit ultrasonic energy for various periods of time in any order (e.g., based on an area and/or how many transducers are used). For example, the controller 500 may be configured to turn on a plurality of transducers 125 at the same time for a period of time.

Figure 6:
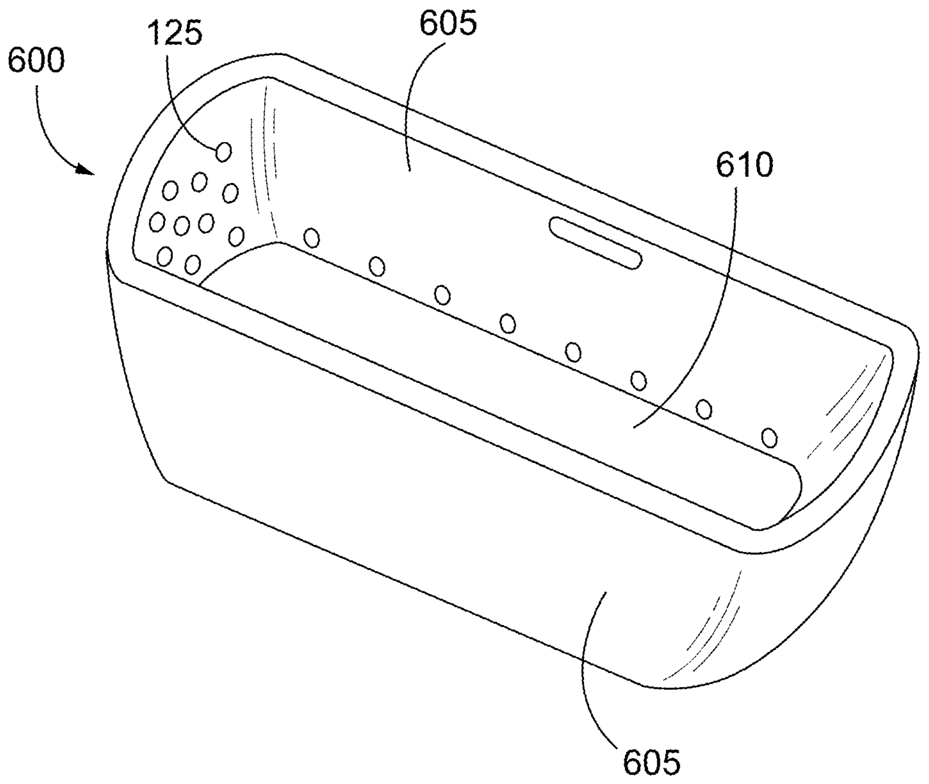
FIG. 6 is a perspective view of an ultrasonic bathing device, according to an exemplary embodiment.
Figure 7:
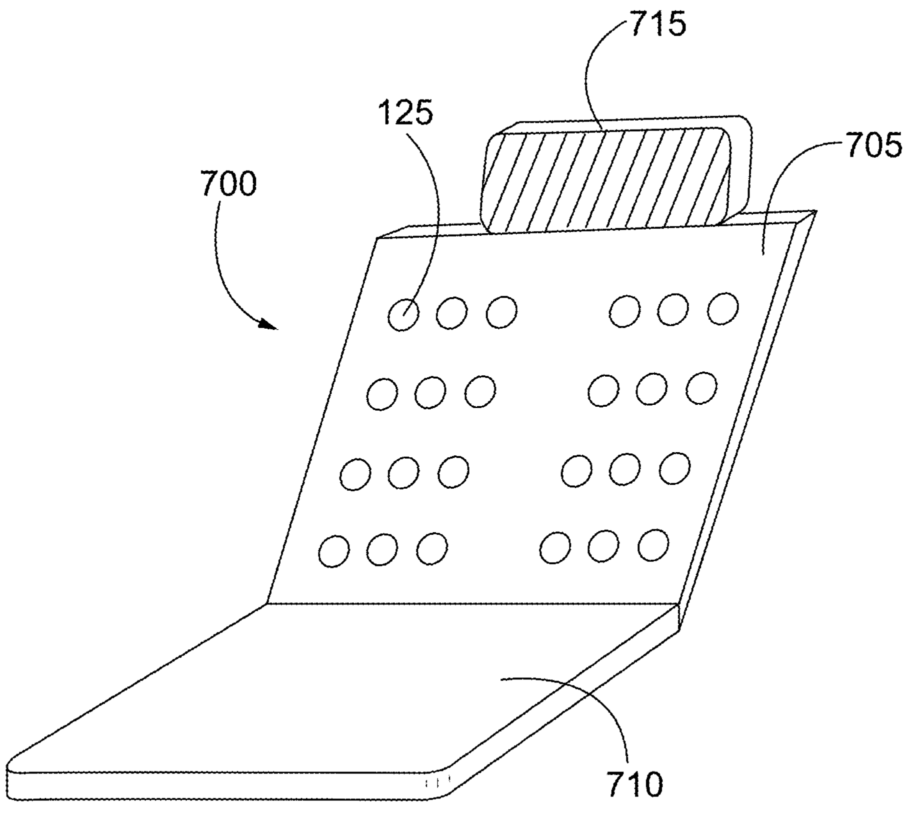
FIG. 7 is a perspective view of an ultrasonic bath insert device, according to an exemplary embodiment.
Figure 8:
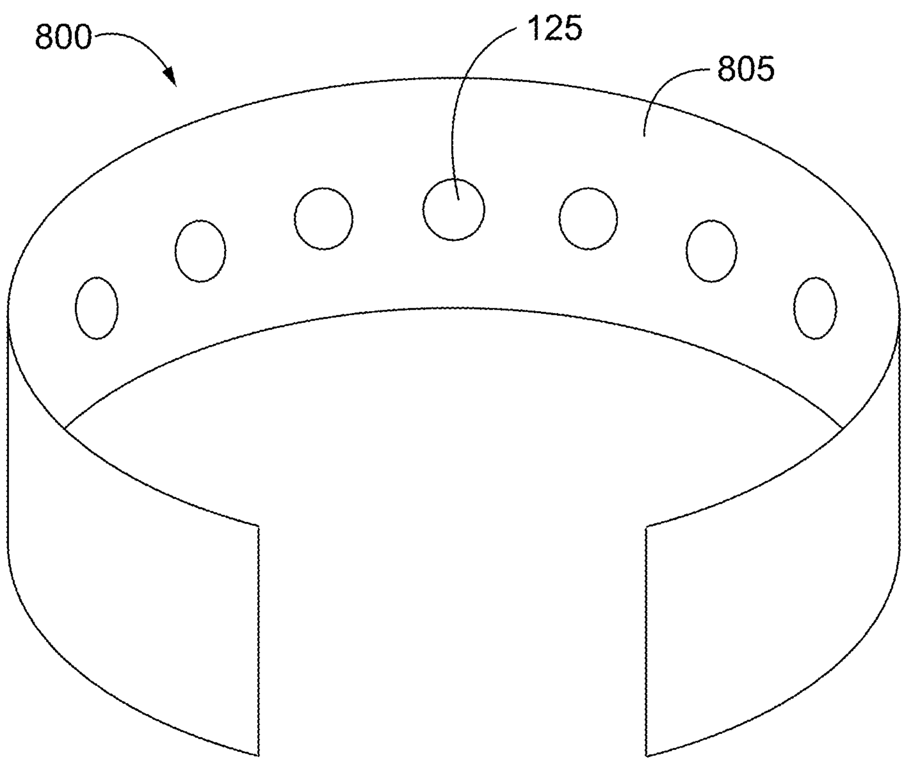
FIG. 8 is a perspective view of an ultrasonic cuff device, according to an exemplary embodiment.

FIGS. 6-8 depict examples of various additional or alternative devices that can include one or more ultrasonic transducers 125 controlled by a controller similar or identical in configuration as the controller 500 in FIG. 5. For example, FIG. 6 depicts an ultrasonic tub 600. The tub 600 can be or can include a bathtub, a spa, a pool, or various other types of containers capable of holding a body of fluid or other mediums. The tub 600 can include a plurality of transducers 125 positioned along a side wall 605 of the tub 600, as depicted in FIG. 6.

The plurality of transducers 125 can be positioned at various portions of the tub 600. For example, the transducers 125 can be positioned equally through the walls 605 of the tub 600, at a predetermined pattern along one or more walls 605, and/or the transducers 125 can be positioned in random sequences along one or more walls 605 of the tub 600. In some implementations, at least one transducer 125 can be positioned along a bottom wall 610 of the tub 600. The transducers 125 can be positioned such that a user's skin is exposed to the effects of the one or more transducers 125 while using the tub 600 (e.g., while sitting or lying in the tub 600).

The tub 600 can include at least one controller (e.g., similar in configuration to controller 500) that can cause the plurality of transducers 125 to selectively turn on or off to generate and transmit ultrasonic energy in variously distributed patterns throughout the tub 600. For example, the transducers 125 can turn on or off in a linear pattern (e.g., such that ultrasonic energy is distributed from left to right, from right to left, from up to down, from down to up, etc.). The transducers 125 can turn on or off in circular or various other shaped patterns, or the transducers 125 can turn on or off randomly or in various other patterns to move ultrasonic energy throughout the tub 600. The tub 600 can include various additional or alternative sensors for the controller of the tub 600 to operate the transducers 125. For example, the tub 600 can include at least one water level sensor for the controller of the tub 600 to determine a predetermined amount of water is within the tub 600 prior to turning on one or more transducers 125.

FIG. 7 depicts an ultrasonic insert 700. The insert 700 can be or can include a bath insert capable of being placed in a bathtub, pool, spa, or other container capable of holding fluid. The insert 700 can be shaped to generally conform to a user sitting on the insert 700. For example, the insert 700 can include a chair-like shape.

The insert 700 can include a plurality of transducers 125 positioned along a back rest 705 of the insert 700, as depicted in FIG. 7, or the insert 700 can include one or more transducers 125 in various other positions of the insert 700. For example, the insert 700 can include at least one transducer 125 located along a bottom wall 710 of the insert 700. In some implementations, the insert 700 can include a headrest 715. The headrest 715 can include one or more transducers 125. The transducers 125 can be positioned such that a user's skin is exposed to the effects of the one or more transducers 125 while using the insert 700 (e.g., while sitting on the insert 700).

The insert 700 can include at least one controller (e.g., similar in configuration to controller 500) that can cause the plurality of transducers 125 to selectively turn on or off to generate and transmit ultrasonic energy in variously distributed patterns throughout the insert 700. For example, the transducers 125 can turn on or off in a linear pattern (e.g., such that ultrasonic energy is distributed from left to right, from right to left, from up to down, from down to up, etc.). The transducers 125 can turn on or off in circular or various other shaped patterns, or the transducers 125 can turn on or off randomly or in various other patterns to move ultrasonic energy throughout the insert 700.

FIG. 8 depicts an ultrasonic cuff 800. The cuff 800 can be or can include an arm cuff, a leg cuff, or various other cuffs that are capable of at least partially surrounding a portion of a person's body.

The cuff 800 can include a plurality of transducers 125 positioned along an inner surface 805 of the cuff 800, as depicted in FIG. 8. For example, the cuff 800 can include at least one transducer 125 located along an inner surface 805 of the cuff 800 such that skin of a user's arm, leg, or other body part is exposed to at least one transducer 125 responsive to wrapping the cuff 800 at least partially around the body part. The transducers 125 can be positioned such that a user's skin is exposed to the effects of the one or more transducers 125 while using the cuff 800.

The cuff 800 can include at least one controller (e.g., similar in configuration to controller 500) that can cause the plurality of transducers 125 to selectively turn on or off to generate and transmit ultrasonic energy in variously distributed patterns throughout the cuff 800. For example, the transducers 125 can turn on or off in a linear pattern (e.g., such that ultrasonic energy is distributed from left to right, from right to left, from up to down, from down to up, etc.). The transducers 125 can turn on or off in circular or various other shaped patterns, or the transducers 125 can turn on or off randomly or in various other patterns to move ultrasonic energy throughout the cuff 800.

The hardware and data processing components (such as the controllers) used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the bathing components as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. An ultrasonic showering device, comprising:

a head portion including a plurality of nozzles configured to dispense a fluid, a movement component, which includes at least one roller ball, configured to detect and guide movement of the head portion, and an ultrasonic transducer configured to generate and transmit ultrasonic energy; and a handle portion including a controller configured to operate the ultrasonic transducer based on the movement component.

2. The ultrasonic showering device of claim 1, wherein the handle portion further includes a battery configured to operate the ultrasonic transducer.

3. The ultrasonic showering device of claim 1, wherein the handle portion includes a cord configured to electrically couple the ultrasonic transducer to an electricity source.

4. The ultrasonic showering device of claim 1, wherein:

the ultrasonic transducer is positioned at a center portion of the head portion; and the plurality of nozzles and the movement component are positioned circumferentially around the ultrasonic transducer.

5. The ultrasonic showering device of claim 1, wherein the controller is configured to cause the ultrasonic transducer to generate ultrasonic energy at a frequency in the range of 1 MHz to 3 MHz.

6. An ultrasonic cosmetic device, comprising:

a head portion including an ultrasonic transducer configured to generate and transmit ultrasonic energy; and a handle portion including a controller configured to operate the ultrasonic transducer;

wherein at least one of the head portion or the handle portion includes a movement component, which includes at least one roller ball, configured to detect and guide movement of the ultrasonic cosmetic device; and wherein the controller is configured to selectively control the ultrasonic transducer based on the movement component.

7. The ultrasonic cosmetic device of claim 6, wherein the movement component further comprises at least one of an accelerometer, a camera, an infrared light sensor, a visible light sensor, a microphone, an acoustic sensor, a triboelectric sensor, an inertia-switch sensor, a temperature, or a vibration sensor.

8. The ultrasonic cosmetic device of claim 6, wherein the handle portion further includes a battery configured to operate the ultrasonic transducer.

9. The ultrasonic cosmetic device of claim 6, wherein the ultrasonic transducer is positioned at a center portion of the head portion.

10. The ultrasonic cosmetic device of claim 6, wherein the controller is configured to cause the ultrasonic transducer to generate ultrasonic energy at a frequency in the range of 1 MHz to 3 MHz.

11. The ultrasonic cosmetic device of claim 6, wherein the head portion further includes at least one nozzle configured to dispense a moisturizer.

12. The ultrasonic showering device of claim 1, wherein the at least one roller ball protrudes outward beyond the plurality of nozzles and is configured to engage with a surface to guide the head portion along the surface by rolling the at least one roller ball.

* * * * *